United States Patent
Liu et al.

(10) Patent No.: US 9,440,693 B2
(45) Date of Patent: Sep. 13, 2016

(54) AIR-HARDENABLE BAINITIC STEEL PART

(71) Applicant: CATERPILLAR INC., Peoria, IL (US)

(72) Inventors: Tianjun Liu, Edwards, IL (US); Matthew Thomas Kiser, Chillicothe (IL)

(73) Assignee: Caterpillar Inc., Peoria, IL (US)

( * ) Notice: Subject to any disclaimer, the term of this patent is extended or adjusted under 35 U.S.C. 154(b) by 369 days.

(21) Appl. No.: 14/220,971

(22) Filed: Mar. 20, 2014

(65) Prior Publication Data

US 2015/0266526 A1  Sep. 24, 2015

(51) Int. Cl.
| | |
|---|---|
| *C21D 8/00* | (2006.01) |
| *C22C 38/00* | (2006.01) |
| *C22C 38/02* | (2006.01) |
| *C22C 38/04* | (2006.01) |
| *C22C 38/18* | (2006.01) |
| *B62D 55/20* | (2006.01) |
| *C21D 9/00* | (2006.01) |
| *C22C 38/12* | (2006.01) |
| *C22C 38/14* | (2006.01) |
| *C22C 38/22* | (2006.01) |

(Continued)

(52) U.S. Cl.
CPC ............... *B62D 55/20* (2013.01); *C21D 8/005* (2013.01); *C21D 9/0068* (2013.01); *C21D 9/0087* (2013.01); *C22C 38/001* (2013.01); *C22C 38/02* (2013.01); *C22C 38/04* (2013.01); *C22C 38/12* (2013.01); *C22C 38/14* (2013.01); *C22C 38/18* (2013.01); *C22C 38/22* (2013.01); *C22C 38/24* (2013.01); *C22C 38/28* (2013.01); *C22C 38/32* (2013.01); *C22C 38/34* (2013.01); *C22C 38/38* (2013.01); *C21D 7/13* (2013.01); *C21D 2211/001* (2013.01); *C21D 2211/002* (2013.01); *C21D 2211/005* (2013.01); *C21D 2211/008* (2013.01); *C21D 2221/00* (2013.01); *C21D 2261/00* (2013.01)

(58) Field of Classification Search
CPC .. C21D 8/005; C21D 9/0068; C21D 9/0087; C22C 38/01; C22C 38/02; C22C 38/04; C22C 38/12; C22C 38/14; C22C 38/18; C22C 38/22; C22C 38/24; C22C 38/28; C22C 38/32; C22C 38/34; C22C 38/38
See application file for complete search history.

(56) References Cited

U.S. PATENT DOCUMENTS

| | | | |
|---|---|---|---|
| 5,419,792 | A | 5/1995 | King et al. |
| 5,759,309 | A | 6/1998 | Watts et al. |

(Continued)

FOREIGN PATENT DOCUMENTS

| | | |
|---|---|---|
| EP | 604623 | 3/2004 |
| EP | 1911536 A1 | 4/2008 |

(Continued)

*Primary Examiner* — Colleen Dunn
(74) *Attorney, Agent, or Firm* — Procopio, Cory, Hargreaves & Savitch LLP (57) ABSTRACT

A method of producing a forged steel part is disclosed. The method includes providing a steel billet that can be selectively hardened to different hardness levels by varying the air cooling rate. The method also includes heating the steel billet to an austenization temperature of the steel billet. The method further includes hot forging the steel billet to form the steel part including a first region and a second region. The method yet further includes selectively cooling the hot forged steel part by air cooling the first region at a first cooling rate and air cooling the second region at a second cooling rate that is less than the first cooling rate.

20 Claims, 2 Drawing Sheets

(51) Int. Cl.
*C22C 38/24* (2006.01)
*C22C 38/28* (2006.01)
*C22C 38/32* (2006.01)
*C22C 38/34* (2006.01)
*C22C 38/38* (2006.01)
*C21D 7/13* (2006.01)

(56) References Cited

U.S. PATENT DOCUMENTS

| | | | |
|---|---|---|---|
| 5,820,706 A * | 10/1998 | Bellus | C21D 1/02 |
| | | | 148/649 |
| 6,074,599 A | 6/2000 | Murty et al. | |
| 6,394,793 B1 | 5/2002 | Bunge | |
| 7,806,992 B2 | 10/2010 | Hase et al. | |
| 8,328,960 B2 | 12/2012 | Gomez et al. | |
| 2012/0080122 A1 * | 4/2012 | Chida | C21D 1/06 |
| | | | 148/318 |
| 2014/0283960 A1 * | 9/2014 | Liu | C22C 38/38 |
| | | | 148/575 |

FOREIGN PATENT DOCUMENTS

| | | |
|---|---|---|
| EP | 2357262 | 8/2011 |
| EP | 2357262 A1 * | 8/2011 |
| EP | 2444511 | 4/2012 |
| EP | 2444511 A1 * | 4/2012 |
| EP | 2895653 | 7/2015 |
| JP | S6075514 | 4/1985 |
| WO | 2007108486 A1 | 9/2007 |
| WO | 2014041251 | 3/2014 |
| WO | 2014153398 | 9/2014 |

* cited by examiner

FIG. 1

CONTINUOUS COOLING TRANSFORMATION (CCT)

AIR-HARDENABLE BAINITIC STEEL PART

TECHNICAL FIELD

The present disclosure relates generally to an air-hardenable bainitic steel part and, more particularly, to an air-hardenable bainitic steel part selectively hardened to different hardness levels by varying the air cooling rate.

BACKGROUND

Structural components for machinery, such as track links used on the undercarriage of track-type earth moving machines, are required to have material characteristics that include a good yield strength, good wear resistance, good toughness, and good rolling contact fatigue resistance. Track links used on the tracks of a track-type machine such as a bulldozer or other earth moving equipment are well known in the industry.

The manufacturing processes for obtaining the desired material characteristics in a track link or other structural component have typically included hot forging the component from a steel billet, followed by cooling, reheating to austenization temperatures, quenching, and tempering. These heat treatment processes may then be followed by additional heating of at least select portions of the component, quenching again, and tempering again before the final machining. Processing of a track link includes first heating a steel billet to approximately 1150-1350 degrees C. to bring the material to an austenite phase field, and then hot forging billet into a part. The part is then slowly cooled to room temperature, followed by two heat treatment processes. In the first heat treatment process the track link is reheated to austenization temperature, quenched to room temperature, and then tempered to a hardness of approximately 30-39 Rockwell C hardness (HRC). In the second heat treatment process just the rail portion of the track link is locally reheated by induction, quenched to room temperature, and tempered to a hardness of 51-57 HRC. These heat treatment processes result in the track link having a hard rail and a softer body. The body of the link is then machined into final shape. The heat treatment processes add significantly to the expense of producing the components, and also require significant capital expenditures for furnaces, as well as ongoing maintenance expenses.

An alternative process for hardening a forged track chain link having a pad portion, a rail portion, a first side portion and a second side portion is disclosed in U.S. Pat. No. 5,759,309 to K. Watts ("the '309 patent"). The '309 patent discloses a quench tank adapted for spraying one or more of the track chain link portions with a quenchant at a controlled amount of quenchant flow rates, quenchant pressures and quench times. One or more of the track chain link portions are spayed with the quenchant at a controlled amount of one or more of a plurality of quenchant flow rates, a plurality of quenchant pressures and a plurality of quench times. The pad and rail portions are simultaneously hardened to predetermined respective hardnesses.

The steel part produced in accordance with the chemistry and processes of the present disclosure is directed toward overcoming one or more of the problems discovered by the inventors or that is known in the art.

SUMMARY

In one embodiment, a method of producing a forged steel part is disclosed. The method includes providing a steel billet having a composition including, on a weight basis: 0.25-0.50 weight percent Carbon, 1.30-3.00 weight percent Manganese, and 0.30-2.50 weight percent Silicon. The method also includes heating the steel billet to an austenization temperature of the steel billet. The method further includes hot forging the steel billet to form the steel part including a first region and a second region. The method yet further includes selectively cooling the hot forged steel part by air cooling the first region at a first cooling rate and air cooling the second region at a second cooling rate that is less than the first cooling rate.

In another embodiment, a steel part for an earth moving machine is disclosed. The steel part including a composition including, on a weight basis: 0.25-0.50 weight percent Carbon, 1.30-3.00 weight percent Manganese, 0.30-2.50 weight percent Silicon, 0.00-0.50 weight percent Vanadium, 0.02-0.06 weight percent Titanium, 0.010-0.040 weight percent Sulfur, 0.0050-0.0150 weight percent Nitrogen, 0.00-2.00 weight percent Chromium, 0.00-0.50 weight percent Molybdenum, 0.00-0.005 weight percent Boron, and a balance of iron and incidental impurities. The steel part also includes a first region with a first microstructure including from 0% to 40% by volume of bainite and a second region with a second microstructure including from 50% to 100% by volume of bainite.

DETAILED DESCRIPTION

A steel part including selectively air hardened regions with enhanced strength, wear, and toughness characteristics and a method for manufacturing the steel part are disclosed. In embodiments, the steel part includes a first portion with a first set of characteristics and a second portion with a second set of characteristics. The steel part may be economically produced by cooling the first portion at a first cooling rate and by cooling the second portion at a second cooling rate without requiring heat treatment processes previously thought necessary to achieve desired strength, wear, and toughness characteristics of the first region and the second region. Significant cost savings may be achieved by producing the desired first set of characteristics and second set of characteristics without the heat treatment processes after forging the part. Capital investments for heat treatment capacity and maintenance costs on the furnaces and other equipment may be reduced.

Figure 1:
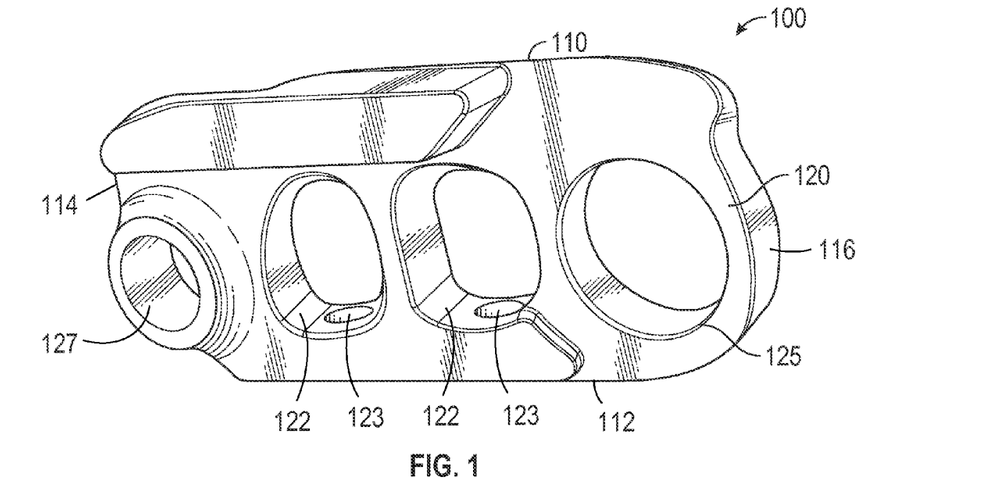
FIG. 1 is a perspective view of an exemplary steel part.

FIG. 1 is a perspective view of an exemplary steel part. As illustrated in FIG. 1, the exemplary steel part is a track link 100. A track link 100 typically includes a body 120 and a rail 110. Body 120 may include a first end 114 and a second end 116. Body 110 may also include a shoe abutment surface 112 extending along body 120 between first end 114 and second end 116.

Body 120 may include one or more holes. In the embodiment illustrated, body 120 includes a pin hole 127 adjacent first end 114 and a bushing hole 125 adjacent the second end 116. Bushing hole 125 may be configured to receive a bushing, which may also be pressed into a second track link 100. A pin may then be inserted through pin hole 127 to link two track links 100 together. As illustrated, body 120 also includes one or more inner holes 122. Inner holes 122 may be configured to reduce the weight of track link 100 and may provide access to one or more fastener bores 123. Each fastener bore 123 may extend from an inner hole 122 to shoe abutment surface 112. Fasteners, such as bolts, may be inserted into fastener bores 123 to secure track link to the shoes.

The rail 110 is an edge of body 120 and may extend the length of body 120. Rail 110 is located opposite to shoe abutment surface 112. When the track link 100 is assembled within the track assembly, the rail 110 is oriented to contact the track rollers, and the idler.

The rail 110 generally has a high hardness, whereas the body 120 generally has a lower hardness for increased machinability. A high hardness in the rail 110 may be necessary as the rail 110 may be subjected to severe wear and spallation from recurring contact with track rollers. A lower hardness in the body 120 may allow features in the body 120, such as holes 125, to be more easily machined into the body 120. The lower hardness of the body 120 may also allow for a press fit between a bushing and a corresponding hole 125 without creating excessive residual stresses. While FIG. 1 illustrates the track link 100, the steel part may be any part made of steel including a first region having a higher hardness than a second region, such as undercarriage rollers, idlers, and components for ground engaging tools.

The first microstructure and the second microstructure each include a different percentage of bainite, which may result in the different hardnesses of the first region and the second region. Bainite is a microstructure that forms in steels at varying temperatures and cooling rates depending on alloy content. Bainite is one of the decomposition products that may form when austenite (the face centered cubic crystal structure of iron) is cooled past a critical temperature, the critical temperature being dependent on alloy content. A lower bainitic microstructure may be similar in appearance and hardness characteristics to tempered martensite. A fine, non-lamellar structure, bainite commonly consists of cementite and dislocation-rich ferrite. The high concentration of dislocations in the ferrite present in bainite makes this ferrite harder than it normally would be.

In some embodiments, the first microstructure includes up to 40% by volume of bainite. In other embodiments, the first microstructure includes up to 20% by volume of a bainite. In yet other embodiments, the first microstructure includes no bainite.

In some embodiments, the second microstructure includes up to 100% by volume of bainite. In other embodiments, the second microstructure includes from 50% to 100% by volume of bainite. In yet other embodiments, the second microstructure includes up to 80% by volume of bainite. In still other embodiments, the second microstructure includes from 50% to 80% by volume of bainite.

Figure 2:
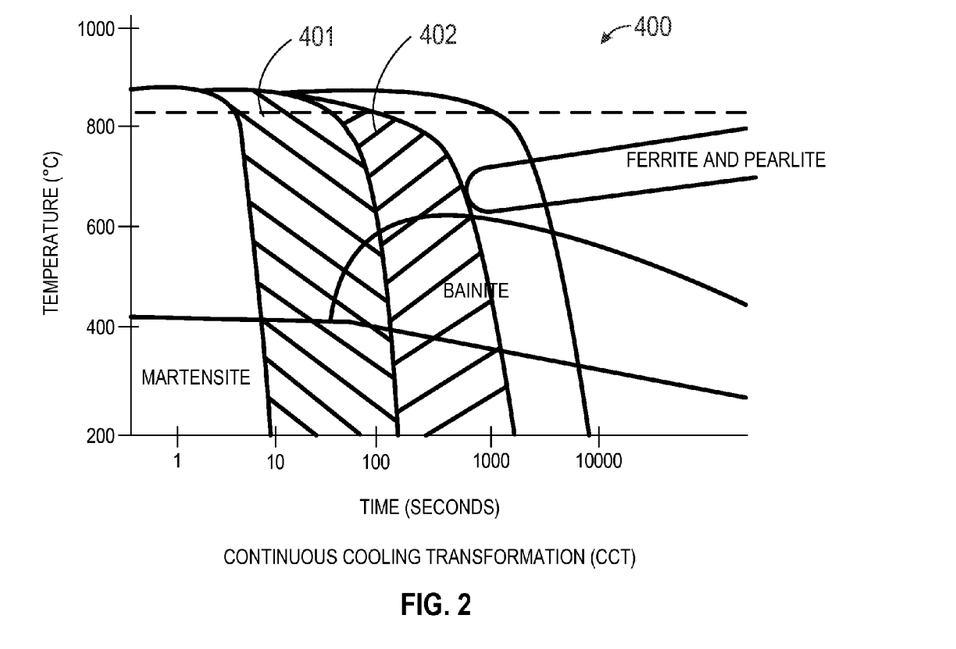
FIG. 2 is a continuous cooling transformation (CCT) diagram for producing the microstructure of an exemplary embodiment of the disclosure.

FIG. 2 is an example of a continuous cooling transformation (CCT) diagram. The CCT diagram may be for a specific alloy content. As shown in the CCT diagram, the cooling rate range for transformation to bainite is generally between those for pearlite and martensite. When formed during continuous cooling, the cooling rate to form bainite is more rapid than that required to form ferrite and pearlite, but less rapid than that required to form martensite (in steels of the same composition). In accordance with various implementations of this disclosure, steel having the chemistry discussed in more detail below may be initially heated to austenization temperatures of approximately 1150-1350° C. and hot forged into the desired shape. The first region and the second region of the forged steel part may be control cooled from the forging temperature to achieve the bainitic microstructures of the first microstructure and the second microstructure.

The first region and the second region may be simultaneously control cooled at different cooling rates after hot forging, which may result in the different microstructures of the first microstructure and the second microstructure. Air cooling, such as still air cooling and forced air cooling using a blower, may be used to simultaneously achieve a first cooling rate for the first region and a second cooling rate for the second region. The blower may be a fan or other means for moving air across the first region or the second region to achieve the desired cooling rate for each region.

The first cooling rate and the second cooling rate may be determined by reference to a CCT diagram, such as the CCT diagram 400 shown in FIG. 2, to know the range for cooling rates passing through the bainite transformation region and, thereby, controlling to the determined cooling rate range. The CCT diagram 400 is an embodiment of a CCT diagram illustrating the cooling rate ranges for a steel part. CCT diagram 400 illustrates a first cooling rate range 401 for a first region of the steel part, such as rail 110, and a second cooling rate range 402 for a second region of the steel part, such as body 120. A CCT diagram, such as CCT diagram 400, may have been previously prepared, stored in a database, or otherwise made available for control of the cooling process.

In embodiments, the first cooling rate is greater than the second cooling rate. In some embodiments, the first cooling rate is at least 1° C. per second (60° C. per minute) when cooling the first region over a predetermined temperature range. In other embodiments, the first cooling rate is from 1° C. per second (60° C. per minute) to 5° C. per second (300° C. per minute) when cooling the first region over the predetermined temperature range.

In some embodiments, the second cooling rate is less than 1° C. per second (60° C. per minute) when cooling the second region over the predetermined temperature range. In other embodiments, the second cooling rate is between 0.1° C. per second (6° C. per minute) and 1° C. per second (60° C. per minute) when cooling the second region over the predetermined temperature range.

In some embodiments, the cooling rates are applied over the predetermined temperature range from the hot forging temperature of the steel part to atmospheric air temperature. In other embodiments, the cooling rates are applied over the predetermined temperature range from approximately 900° C. to 300° C. In various alternative implementations, the steel part may be cooled rapidly down to about the eutectoid transformation temperature, prior to cooling the first region at the first cooling rate and the second region at the second cooling rate over the predetermined temperature range.

Figure 3:
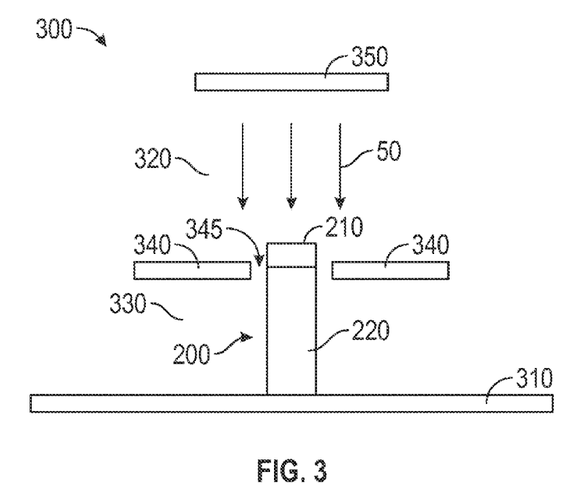
FIG. 3 is an end view of an exemplary cooling system 300.

FIG. 3 is an end view of an exemplary cooling system 300. Cooling system 300 includes a cooling bed 310, a first cooling area 320, a second cooling area 330, a baffle 340, and blower 350. In embodiments, the cooling system 300 may be a cooling tunnel. The cooling bed 310 is configured to move a steel part 200 including a first region 210 and a second region 220 across the cooling system 300. In embodiments, the first region 210 may be a surface, a side, an edge or a thin layer of the steel part 200 on/adjacent the second region 220. Cooling bed 310 may be a conveyor belt, a roller, or a hanger which holds the part with a hook. First cooling area 320 is configured to provide a first set of cooling conditions. Second cooling area 330 is adjacent first cooling area 320 and is configured to provide a second set of cooling conditions.

Baffle 340 is located between the first cooling area 320 and the second cooling area 330. Baffle 340 is configured to separate the first cooling area 320 and the second cooling area 330. Baffle 340 may extend across the length of the cooling system 300. Baffle 340 may include an opening 345, such as a slot across its length. Opening 345 is configured so that first region 210 can be within the first cooling area 320 and the second region 220 can be within the second cooling area 330.

In the embodiment illustrated, baffle 340 is oriented in a horizontal direction, such as approximately parallel to cooling bed 310, and may be offset from cooling bed 310 forming the second cooling area 330 there between. The first cooling area 320 in the embodiment illustrated is located above the baffle 340. In other embodiments, the first cooling area 320 is located between the baffle 340 and the cooling bed 310, and the second cooling area 330 is located above the baffle 340. In further embodiments, the baffle 340 is located vertically, separating the first cooling area 320 and the second cooling area 330 laterally rather than vertically. The vertically oriented baffle 340 may be separated from the cooling bed 310 so that the steel part 200 can extend below the baffle 340 with the first region 210 in the first cooling area 320 and the second region 220 in the second cooling area 330. Other configurations of baffle 340 may also be used.

Blower 350 may be a fan, a group of fans, or other means for directing air 50 at or across first region 210 to cool first region 210 by forced convection at a desired cooling rate, such as the cooling rates disclosed herein. Air 50 may be air from within the first cooling area 320 or may be from a source outside of the cooling system 300. Air 50 may be atmospheric temperature or may be temperature controlled. In the embodiment illustrated in FIG. 3, blower 350 is located in or adjacent the first cooling area 320 above and spaced apart from baffle 340 and is configured to direct air 50 towards first region 210, while baffle 340 is configured to prevent air 50 from being directed down to second region 220. In other embodiments, blower 350 may be located adjacent baffle 340 and may be configured to direct air 50 towards first region 210 from a different direction.

In the embodiment illustrated, the desired cooling rates for the second region 220, such as the cooling rates disclosed herein, are achieved by cooling the second region 220 in still air. Some natural convection may still occur. In other embodiments a second blower, such as a fan, a group of fans, or other means for directing air at or across second region 220 may be used to cool second region 220 by forced convection at the desired cooling rate, the cooling rate for the second region 220 being lower than the cooling rate for the first region 210.

Alloying elements may lower the temperature required for the maximum rate of formation of bainite. Carbon may be the most effective in doing so. Bainite generally has a hardness that is greater than the typical hardness of pearlite and less than the hardness of martensite. Pearlite in the microstructure may contribute to reduced toughness. The composition and processing of the steel part according to various embodiments of this disclosure may be selected to avoid or at least minimize the amount of pearlite present. In commercial practice a small amount of pearlite, such as less than 5 percent by volume, may unavoidably be present, particularly in the center of large sections, but care is taken to minimize its presence and effects.

The bainite microstructure essentially has a two-phase microstructure composed of ferrite and iron carbide or cementite. Depending on the composition of the austenite during the hot forging process, and the cooling rate after hot forging, there is a variation in the morphology of the resulting bainite. The resulting microstructures are referred to as upper bainite or lower bainite. Upper bainite can be described as aggregates of ferrite laths that usually are found in parallel groups to form plate-shaped regions. The carbide phase associated with upper bainite is precipitated at the interlath regions, and depending on the carbon content, these carbides can form nearly complete carbide films between the lath boundaries. Lower bainite also consists of an aggregate of ferrite and carbides. The carbides precipitate inside of the ferrite plates. The carbide precipitates are on a very fine scale and in general have the shape of rods or blades. For this reason, the bainitic microstructure becomes useful in that no additional heat treatments are required after initial cooling to achieve a hardness value between that of pearlitic and martensitic steels. The material characteristics of a forged steel part, such as a microalloyed forged steel part, can vary over a large range depending on the particular types and quantities of alloying elements included in the composition. When steel contains sufficient amounts of Si and/or Al, the carbide formation can be significantly retarded such that carbide does not have enough time to form during the continuous cooling process, resulting in a mixed microstructure of bainitic ferrite and retained austenite. This type of bainitic microstructure may be referred to as "carbide free" bainite. It has been found that such bainite may provide superior toughness to conventional types of bainite.

The composition of alloying elements included in accordance with various embodiments of this disclosure along with selectively cooling the first region 210 and the second region 220 results in a steel part having the strength, hardness, and toughness characteristics previously achieved by including the intermediate heat treatment steps following hot forging of reheating to austenization temperatures, quenching, and tempering followed by additional heating of the first region 210, quenching again, and tempering again. Selectively cooling the first region 210 and the second region 220 may eliminate the intermediate heat treatment steps before final machining of the forged steel part in accordance with various implementations of this disclosure.

The desired material characteristics discussed above may be achieved by the formation of the bainitic microstructure balanced with ferrite and/or martensite type of microstructure. The desired hardness of the first region 210 and the second region 220 may be achieved by the amount of bainite formed in each region. The amount of bainite formed in each region may be at least partially the result of selectively cooling the first region 210 and the second region 220. Generally, the hardness of the steel increases with an increased percentage of the martensitic microstructure. As the first region 210 includes a higher percentage of the martensitic microstructure relative to the second region 220, the first region 210 will include an increased hardness relative to the second region 220. The increased hardness may improve the wear resistance of the first region 210.

The alloying elements that are added to the composition in accordance with various embodiments of this disclosure may also be selected to obtain the desired volume percentages of bainitic microstructure in each region, to account for varying cooling rates that may be experienced in different sections or portions of each region having different thicknesses.

It has been discovered in various implementations of this disclosure that the bainitic microstructure obtained in each region after selectively air-cooling the first region 210 and the second region 220 may also exhibit the same or similar hardness and strength characteristics in each region as were previously achieved by following hot forging with reheating to austenization temperatures, quenching, and tempering followed by additional heating of the first region 210, quenching again, and tempering again. The types and quantities of microalloying elements included in the composition of the air-hardenable, bainitic steel in accordance with various embodiments may also enable achievement of the hardness levels after air cooling of each region.

In embodiments, the martensitic and bainitic microstructure formed in the first region 210 according to various implementations of this disclosure results in a hardness from 48 Rockwell C hardness (HRC) to 55 HRC. In other embodiments, the martensitic and bainitic microstructure formed in the first region 210 according to various implementations of this disclosure results in a hardness of approximately 50 HRC.

In embodiments, the bainitic microstructure formed in the second region 220 according to various implementations of this disclosure results in a hardness from 35 HRC to 45 HRC. In other embodiments, the bainitic microstructure formed in the second region 220 according to various implementations of this disclosure results in a hardness of approximately 40 HRC.

In some embodiments, the martensitic and bainitic microstructures formed in the first region 210 and the bainitic microstructure formed in the second region 220 according to various implementations of this disclosure result in an impact toughness from 35 Joules (J) to 45 J in the Charpy v-notch impact test at room temperature. In other embodiments, the martensitic and bainitic microstructures formed in the first region 210 and the bainitic microstructure formed in the second region 220 according to various implementations of this disclosure result in an impact toughness of approximately 40 J in the Charpy v-notch impact test at room temperature.

In some embodiments, the steel part according to this disclosure has a chemical composition, by weight, as listed in Table 1:

TABLE 1

Composition of steel in weight percent.

| Constituents | Concentration by weight (%) |
| --- | --- |
| Carbon | 0.25-0.50 |
| Manganese | 1.30-3.00 |
| Silicon | 0.30-2.50 |
| Optional Titanium | 0.02-0.06 |
| Optional Vanadium | 0.00-0.50 |
| Optional Nitrogen | 0.0050-0.0150 |
| Optional Sulfur | 0.010-0.040 |
| Optional Chromium | 0.00-2.00 |
| Optional Molybdenum | 0.00-0.50 |
| Optional Boron | 0.00-0.005 |
| Iron and other residual elements | Balance |

In other embodiments, the steel part according to this disclosure has a chemical composition, by weight, as listed in Table 2:

TABLE 2

Composition of steel in weight percent.

| Constituents | Concentration by weight (%) |
| --- | --- |
| Carbon | 0.32-0.36 |
| Manganese | 1.30-2.00 |
| Titanium | 0.03-0.05 |
| Vanadium | 0.08-0.12 |
| Silicon | 1.30-2.00 |
| Nitrogen | 0.0050-0.0130 |
| Sulfur | 0.010-0.035 |
| Chromium | 0.50-0.90 |
| Molybdenum | 0.15-0.25 |
| Optional Boron | 0.00-0.0050 |
| Iron and other residual elements | Balance |

Carbon (C) contributes to the attainable hardness level as well as the depth of hardening. In accordance with various implementations of this disclosure, the carbon content in some embodiments, as shown in Table 1, is from 0.25% to 0.50% by weight to maintain adequate core hardness and steel toughness. In other embodiments, as shown in Table 2, the C content is from 0.32% to 0.36% by weight. The microalloyed, bainitic steel according to various implementations of this disclosure may be air cooled in accordance with select cooling curves on a CCT diagram, such as the CCT diagram of FIG. 2.

Manganese (Mn) is a low cost material and contributes to the deep hardenability and is therefore present in most hardenable alloy steel grades. The disclosed alloy steel in some embodiments, as shown in Table 1, contains Mn in an amount from 1.30% to 3.00% by weight to assure adequate core hardness and prevent manganese segregation and the formation of blocky retained austenite. In other embodiments, as shown in Table 2, the Mn content is from 1.30% to 2.00% by weight.

Silicon (Si) in select amounts, along with the Mn, allows the steel according to this disclosure to form a predominantly bainitic microstructure following air cooling from hot forging temperatures. The Si may also help deoxidation of the molten steel, as well as contributing to the formation of a carbide-free bainite with improved toughness when sufficient Si is added into the steel. The disclosed alloy steel in some embodiments, as shown in Table 1, contains Si in an amount from 0.30-2.50% by weight. In other embodiments, as shown in Table 2, the Si content is from 1.30% to 2.00% by weight.

Chromium (Cr) may contribute to the hardenability of the present steel alloy and may be added in small amounts in order to allow for adjustment of the CCT curve to form a predominantly bainitic microstructure after air cooling. The disclosed alloy steel in some embodiments, as shown in Table 1, contains Cr in an amount not exceeding 2.00% by weight as Cr may increase steel costs. In other embodiments, as shown in Table 2, the Cr content is from 0.50% to 0.90% by weight.

Small amounts of other elements including Molybdenum (Mo) and Boron (B) may also be added to allow for further adjustment of the CCT curve to form a predominantly bainitic microstructure after air cooling. The disclosed alloy steel in some embodiments, as shown in Table 1, contains Mo in an amount from 0.00-0.50% by weight. In other embodiments, as shown in Table 2, the Mo content is from 0.15% to 0.25% by weight. The disclosed alloy steel in some embodiments, as shown in Table 1 and Table 2, contains B in an amount from 0.00-0.0050% by weight.

Vanadium (V) and Nitrogen (N), despite their small quantities, may be added to provide precipitation hardening and to realize a consistently measurable enhancement of case and core hardness. The disclosed alloy steel in some embodiments, as shown in Table 1, contains V in an amount from 0.00-0.5% by weight. In other embodiments, as shown in Table 2, the V content is from 0.08% to 0.12% by weight. The disclosed alloy steel in some embodiments, as shown in Table 1, contains N in an amount from 0.0050-0.0150% by weight. In other embodiments, as shown in Table 2, the N content is from 0.0050% to 0.0130% by weight.

Titanium (Ti) may also be provided in small amounts to form titanium carbonitrides to prevent grain coarsening before and after forging. N may combine with the Ti in the steel to form titanium carbonitrides to prevent grain coarsening during the reheat prior to forging and during the cooling after hot forging. Without Ti and N, the forged steel may have large prior austenite grain sizes, resulting in poor toughness. The disclosed alloy steel in some embodiments, as shown in Table 1, contains Ti in an amount from 0.02-0.06% by weight. In other embodiments, as shown in Table 2, the Ti content is from 0.03% to 0.05% by weight.

Sulfur (S), which in small amounts may be beneficial in that it promotes machining, may also be provided in small enough amounts so as to not contribute to significant loss of ductility and toughness. The disclosed alloy steel in some embodiments, as shown in Table 1, contains S in an amount from 0.010-0.040% by weight. In other embodiments, as shown in Table 2, the S content is from 0.010% to 0.035% by weight.

The remainder of the alloy steel composition is essentially iron (Fe), except for nonessential or residual amounts of elements which may be present in small amounts. Phosphorus (P) in an amount over 0.05% may cause embrittlement. The disclosed alloy steel in some embodiments contains less than 0.035% by weight of P. In other embodiments the P content is less than 0.020% by weight. Other elements, such as aluminum (Al), generally regarded as the residual elements after steel deoxidation may be present within commercially recognized allowable trace amounts, such as up to 0.015% by weight of Al and may be considered incidental impurities.

Manufactured articles, such as track link 100, having the above stated composition, may be advantageously initially formed to a desired shape by hot forging after heating up the microalloyed steel to austenization temperatures of approximately 1150-1350° C. A first region 210, such as rail 110, and a second region 220, such as body 120, are then selectively air cooled, as disclosed herein, before final machining to a desired final dimension.

INDUSTRIAL APPLICABILITY

The steel part 200 and method of making the steel part 200 in accordance with various implementations of the present disclosure may reduce costs by eliminating heat treatment steps typically performed after hot forging. The disclosed forged and selectively air hardened bainitic steel may provide similar hardness, strength, and toughness characteristics to previously hot forged and heat treated steel parts, but without requiring the heat treatment processes after forging. The elements in combination with the controlled air cooling of each region of the steel part 200 may produce a different bainitic microstructure for each region after air cooling from hot forging temperatures. Microalloying elements, such as vanadium and nitrogen, may also be included to further refine the microstructure for each region.

The steel part 200 produced in accordance with various implementations of this disclosure exhibits material characteristics that may include first region 210 with a higher hardness that may be for good impact and wear resistance, and a second region 220 with a lower hardness for good machinability with no heat treatment and a body yield strength that is greater than 800 mega-pascals (MPa) after the air cooling.

Figure 4:
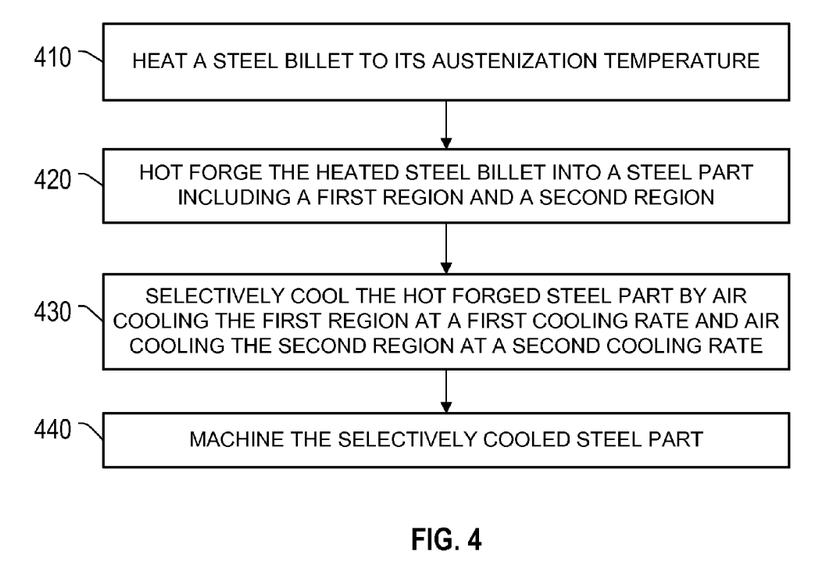
FIG. 4 is a flowchart of a method for producing a steel part including a first region with a first hardness and a second region with a second hardness.

FIG. 4 is a flowchart of a method for producing a steel part 200 including a first region 210 with a first hardness and a second region 220 with a second hardness. The method includes heating steel, such as a steel billet, to its austenization temperature at step 410. The steel may have the composition disclosed herein with reference to Table 1 or the composition disclosed herein with reference to Table 2. The austenization temperature may be approximately 1150° C. to 1350° C. The size of the finished part may determine the size of a steel billet.

The method also includes hot forging the heated steel billet into a steel part 200 including a first region 210 and a second region 220 at step 420. The method further includes selectively cooling the hot forged steel part 200 by air cooling the first region 210 at a first cooling rate and air cooling the second region 220 at a second cooling rate at step 430. The first cooling rate may be configured to produce a first bainitic microstructure and a first hardness in the first region 210 and the second cooling rate may be configured to produce a second bainitic microstructure and a second hardness in the second region 220. The cooling rates, the bainitic microstructures, and the hardnessses may be the cooling rates, the bainitic microstructures, and the hardnessses disclosed herein.

Step 430 may include cooling the first region 210 in a first cooling area 320 and cooling the second region 220 in a second cooling area 330 in a cooling system 300. The steel part 200 may be placed on a cooling bed 310 and oriented such that the first region 210 is in the first cooling area 320 and the second region 220 is in the second cooling area 330. Cooling the first region 210 may be by forced air cooling/forced air convection. Cooling the second region 220 may be by still air cooling or by forced air cooling/forced air convection. The forced air cooling/forced air convection may be accomplished by directing air towards or across the region using one or more blowers 350, such as a fan.

As shown by the CCT diagram of FIG. 2, the cooling rate may be chosen to avoid the formation of a predominantly ferrite and pearlite microstructure. In various alternative implementations, the weight percentages of the alloying elements in the composition of the steel may be varied in order to change the phase transformation curves on the CCT diagram, and achieve the desired bainitic microstructure for each region at the cooling rates provided by the cooling system 300.

The method yet further includes machining the selectively cooled steel part 200 at step 440. This may include the final machining of the steel part 200, and in particular may include machining various features into the second region 220.

The types of steel parts 200 being manufactured in accordance with various implementations of this disclosure may include parts that require a higher hardness and toughness for impact and wear resistance in the first region 210 and a lower hardness for good machinability in the second region 220. One exemplary application of the disclosed compositions and processes is for track links, such as track link 100, used in the tracks of a track-type machine, such as a bulldozer or other earth moving equipment. The rail 110 may require a high hardness because the rail 110 may be subjected to severe wear from continuous contact with track rollers and/or idlers. The body 120 may require a lower hardness for machining holes 125 for bushings, pins, and bolts into the body 120. The lower hardness of the body 120 may also allow for a press fit between a bushing and a hole 125 in the body 120 without creating excessive residual stresses.

It will be apparent to those skilled in the art that various modifications and variations can be made to the disclosed steel and method of forming the steel into a finished part without departing from the scope of the disclosure. Alternative implementations will be apparent to those skilled in the art from consideration of the specification and practice disclosed herein. It is intended that the specification and examples be considered as exemplary only, with a true scope of the disclosure being indicated by the following claims and their equivalents.

What is claimed is:

1. A method of producing a forged steel part, comprising:
   providing a steel billet having a composition including, on a weight basis:
      Carbon: 0.25-0.50 weight percent,
      Manganese: 1.30-3.00 weight percent, and
      Silicon: 0.30-2.50 weight percent;
   heating the steel billet to an austenization temperature of the steel billet;
   hot forging the steel billet to form the steel part including a first region and a second region; and
   selectively cooling the hot forged steel part by air cooling the first region at a first cooling rate and air cooling the second region at a second cooling rate that is less than the first cooling rate.

2. The method of claim 1, wherein the composition of the steel billet further includes vanadium, titanium, sulfur, nitrogen, chromium, molybdenum, boron, and a balance of iron and incidental impurities.

3. The method of claim 1, wherein the composition of the steel billet further includes, on a weight basis:
   Vanadium: 0.00-0.50 weight percent,
   Titanium: 0.02-0.06 weight percent,
   Sulfur: 0.010-0.040 weight percent,
   Nitrogen: 0.0050-0.0150 weight percent,
   Chromium: 0.00-2.00 weight percent,
   Molybdenum: 0.00-0.50 weight percent,
   Boron: 0.00-0.005 weight percent, and
   a balance of iron and incidental impurities.

4. The method of claim 1, further comprising machining the selectively cooled second region.

5. The method of claim 1, wherein the first cooling rate is at least 1° C. per second and the second cooling rate is less than 1° C. per second.

6. The method of claim 1, wherein the composition of the steel billet and the selective cooling of the first region are configured to produce a first hardness of the first region from 45 to 55 Rockwell C hardness and the composition of the steel billet and the selective cooling of the second region are configured to produce a second hardness of the second region from 35 to 45 Rockwell C hardness, and wherein the composition of the steel billet and the selective cooling of the steel part are configured to produce an impact toughness of the first region and the second region from 35 to 45 Joules in a Charpy v-notch impact test at room temperature.

7. The method of claim 1, wherein the composition of the steel billet and the selective cooling of the first region are configured to produce a first microstructure including up to 40% by volume of bainite, and the composition of the steel billet and the selective cooling of the second region are configured to produce a second microstructure including from 50% to 100% by volume of bainite.

8. The method of claim 1, wherein selectively cooling the hot forged steel part includes cooling the hot forged steel part in a cooling system including a cooling bed, a first cooling area, a second cooling area separated from the first cooling area by a baffle, and a blower, and wherein the steel part is placed on the cooling bed, the first region is cooled in the first cooling area by air from the blower, and the second region is cooled in the second cooling area.

9. The method of claim 1, wherein selectively cooling the hot forged steel part includes cooling the first region by forced convection and cooling the second region by still air cooling.

10. The method of claim 1, wherein the steel part is a track link, the first region is a rail of the track link, and the second region is a body of the track link.

11. A steel part for an earth moving machine, the steel part comprising:
    a composition including, on a weight basis:
       Carbon: 0.25-0.50 weight percent,
       Manganese: 1.30-3.00 weight percent,
       Silicon: 0.30-2.50 weight percent,
       Titanium: 0.02-0.06 weight percent,
       Vanadium: 0.00-0.50 weight percent,
       Nitrogen: 0.0050-0.0150 weight percent,
       Sulfur: 0.010-0.040 weight percent,
       Chromium: 0.00-2.00 weight percent,
       Molybdenum: 0.00-0.50 weight percent,
       Boron: 0.00-0.005 weight percent, and
       a balance of iron and incidental impurities;
    a first region with a first microstructure including up to 40% by volume of bainite; and
    a second region with a second microstructure including from 50% to 100% by volume of bainite.

12. The steel part of claim 11, wherein the first region includes a first hardness from 45 to 55 Rockwell C hardness and the second region includes a second hardness from 35 to 45 Rockwell C hardness.

13. The steel part of claim 12, wherein the first region and the second region each include an impact toughness from 35 to 45 Joules in a Charpy v-notch impact test at room temperature.

14. The steel part of claim 11, wherein the first region with the first microstructure including up to 40% by volume of bainite is at least partially the result of selectively cooling the first region from an austenization temperature after hot forging the steel part at a first cooling rate and wherein the second region with the second microstructure including from 50% to 100% by volume of bainite is at least partially the result of selectively cooling the second region from the austenization temperature after hot forging the steel part at a second cooling rate.

15. The steel part of claim 11, wherein the steel part is a track link, the first region is a rail of the track link, and the second region is a body of the track link.

16. A track link for an earth moving machine, the track link comprising:
    a composition including, on a weight basis:
       Carbon: 0.32-0.36 weight percent,
       Manganese: 1.30-2.00 weight percent,
       Titanium: 0.03-0.05 weight percent,
       Vanadium: 0.08-0.12 weight percent,
       Silicon: 1.30-2.00 weight percent,
       Nitrogen: 0.0050-0.0130 weight percent,
       Sulfur: 0.010-0.035 weight percent, Chromium: 0.50-0.90 weight percent,
Molybdenum: 0.15-0.25 weight percent,
Boron: 0.00-0.0050 weight percent, and
a balance of iron and incidental impurities;
a rail with a first microstructure including up to 40% by volume of bainite; and
a body adjacent the rail, the body having a second microstructure including from 50% to 100% by volume of bainite.

17. The track link of claim 16, wherein the rail includes a first hardness from 45 to 55 Rockwell C hardness and the body includes a second hardness from 35 to 45 Rockwell C hardness.

18. The track link of claim 17, wherein the rail and the body each include an impact toughness from 35 to 45 Joules in a Charpy v-notch impact test at room temperature.

19. The track link of claim 16, wherein the rail with the first microstructure including up to 40% by volume of bainite is at least partially the result of selectively cooling the rail at a first cooling rate from an austenization temperature after hot forging the track link and wherein the body with the second microstructure including from 50% to 100% by volume of bainite is at least partially the result of selectively cooling the body at a second cooling rate from the austenization temperature after hot forging the track link.

20. The track link of claim 19, wherein the rail is forced air cooled and the body is still air cooled.

* * * * *